United States Patent Office 2,759,965
Patented Aug. 21, 1956

2,759,965

ESTERS OF ALPHA-(2,4-DICHLOROPHENOXY) PROPIONIC ACID

Louis E. Begin, Midland, Mich., assignor to The Dow Chemical Company, Midland, Mich., a corporation of Delaware No Drawing. Application November 16, 1953,
Serial No. 392,461

9 Claims. (Cl. 260—473)

The present invention relates to esters of alpha-(2,4-dichlorophenoxy)propionic acid and is particularly concerned with compounds having the formula

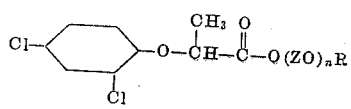

wherein each Z is selected from the group consisting of ethylene and propylene radicals, $n$ is an integer from 1 to 3, inclusive, and R represents an alkyl radical containing from 1 to 4 carbon atoms, inclusive.

In recent years a number of synthetic organic compounds have been disclosed in the art as applicable for the control of undesired vegetation. Some of these compounds operate as general weed killers, having primarily a burning action on the foliage of vegetation while others appear to operate in a more subtle fashion by being absorbed into the plant tissues and upsetting the metabolism of the plant so that eventual death occurs. In many cases, more or less selectivity and specificity of action have been observed but specificity is not general and predictable as between the many compounds which have been suggested for herbicidal application.

In the north temperate zone, wide areas are now devoted to the growing of poplar species which are widely used for the preparation of boxwood and paper pulp. In such operations, it is desirable to eliminate the encroachment of hardwood species in the areas devoted to poplar growing. In the past, it has not generally been profitable to accomplish this by selective cutting as is done in certain other silviculture operations. It is therefore desirable to have available a plant growth control agent characterized by specificity of action such that it may be used for the control of hardwood species (such as oak and maple) growing in mixed stand with poplar without detrimental effects to the latter.

It is an object of the present invention to provide novel esters of alpha-(2,4-dichlorophenoxy)propionic acid. It is a further object of the invention to provide such esters characterized by a high degree of selectivity and specificity of action. Yet another object is to provide new compounds having a high degree of herbicidal activity on oak and maple while being substantially without deleterious effect on polar at the dosages ordinarily required. Other objects will become apparent from the following specification and claims.

The compounds of the invention are the glycol and polyglycol alkyl ether esters of alpha-(2,4-dichlorophenoxy)-propionic acid characterized by the formula as set forth above. The new esters are oily liquids, soluble in many organic solvents and substantially insoluble in water. These compounds are of low volatility, stable to light and air, non-corrosive to the skin of man and higher animals, and are adapted to be employed as modifiers in plastic compositions, preservatives for cellulosic materials, and plant growth regulators. It is among the advantages of the present invention that the new compounds may be employed for the effective control of oak and maple growing in mixed stand with polar without adversely effecting the growth of the latter. It is a further advantage that the new compounds are adapted to be readily formulated in conventional weed killer compositions.

The expression, "plant growth regulators" as employed above refers to compounds which cause effects on vegetation such as the prevention of sprouting of potatoes in storage, the induction of rooting of cuttings and the prevention of premature abscission of pome fruits as well as the prevention of growth and/or killing of undesired plant species.

The compounds of the present invention may be prepared by reacting one molecular proportion of alpha-(2,4-dichlorophenoxy)propionic acid with one molecular proportion of a glycol or polyglycol monoalkyl ether of the formula

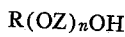

wherein R, Z and $n$ have the significance set forth above. The reaction is preferably carried out in the presence of an esterification catalyst such as sulfuric acid or an aryl sulfonic acid. Good yields are obtained when the reaction is carried out in an inert solvent and water of reaction is removed as formed.

In a preferred method of operation, the alpha-(2,4-dichlorophenoxy)propionic acid, a small molar excess of the glycol or polyglycol monoalkyl ether, the solvent and the catalyst are mixed together and heated for a period of time at a temperature of from about 80° to 150° C. The reaction may be conveniently carried out at the reflux temperature of the solvent with water of reaction being distilled out of the reaction zone as formed. When the reaction has approached completion, heating is discontinued and the reaction product washed with sodium carbonate solution and water to remove the catalyst and any unreacted starting material. The solvent and traces of water are then removed by distillation under reduced pressure to obtain the desired ester product as a residue.

Preferred solvents, used as media for the present reaction, are substantially immiscible with water and boil in the range of 80° to 150° C. Among those found to be convenient in such reactions are hydrocarbons such as benzene, toluene, xylene and halohydrocarbons such as chlorobenzene and ethylene dichloride. Alternatively, it is sometimes convenient to employ an excess of the glycol or polyglycol ether reactant as a reaction solvent, the excess glycol or polyglycol ether together with water of reaction being distilled out of the reaction zone under vacuum during the period of reaction.

The glycol and polyglycol monoalkyl ethers employed as starting materials may be obtained by the reaction of ethylene oxide and/or propylene oxide with the appropriate molecular proportion of a monohydric aliphatic alcohol. The reaction is carried out in the presence of a catalyst such as sulfuric acid or sodium hydroxide. In one method of preparing the glycol ether starting materials, the reactants are mixed and heated together in the presence of the catalyst for a period of about ½ hour at a temperature of from 130° to 170° C. and under autogenous pressure. The mixed reaction product may be employed as such or the individual ether alcohols separated by subjecting the mixed reaction product to fractional distillation under reduced pressure. Alternatively, a step-wise reaction may be carried out as, for example, by reacting equimolecular proportions of alcohol with ethylene oxide to produce an alkoxyethanol followed by reaction of the latter product with propylene oxide to produce an alkoxyethoxypropanol.

The following examples illustrate the invention but are not to be construed as limiting the same:

*Example 1.—Butoxypropoxypropyl ester of alpha-(2,4-dichlorophenoxy)propionic acid*

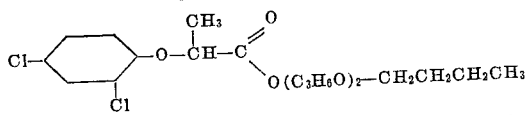

45 grams (0.193 mole) of alpha-(2,4-dichlorophenoxy)propionic acid, 38.5 grams (0.2026 mole) of butoxypropoxypropanol, 250 milliliters of ethylene dichloride and one milliliter of concentrated sulfuric acid were mixed together and heated at a temperature of about 95° C. Ethylene dichloride and water of reaction distilled out of the reaction zone and were condensed and separated, the ethylene dichloride being returned to the reaction vessel. Upon completion of the reaction, as evidenced by the fact that water ceased to be evolved, the crude product was cooled and washed successively with dilute aqueous sodium carbonate solution and water. The washed product was then distilled to recover the ethylene dichloride solvent and to obtain as a residue the butoxypropoxypropyl ester of alpha-(2,4-dichlorophenoxy)propionic acid as an oily liquid having an index of refraction ($n/D$) of 1.4909 at 25° C. and a specific gravity (25°/25°) of 1.1346.

*Example 2.—2-ethoxyethyl ester of alpha-(2,4-dichlorophenoxy)propionic acid*

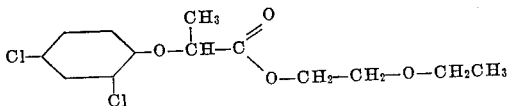

100 grams (0.426 mole) of alpha-(2,4-dichlorophenoxy)propionic acid, 40 grams (0.4475 mole) of 2-ethoxyethanol, 250 milliliters of ethylene dichloride and one milliliter of concentrated sulfuric acid were mixed together and the reaction carried out and product separated according to the procedure of Example 1. The product, the 2-ethoxyethyl ester of alpha-(2,4-dichlorophenoxy)propionic acid, is an oily liquid having a refractive index ($n/D$) of 1.5112 at 25° C. and a specific gravity (25°/25°) of 1.2380.

*Example 3.—2-(2-methoxyethoxy)ethyl ester of alpha-(2,4-dichlorophenoxy)propionic acid*

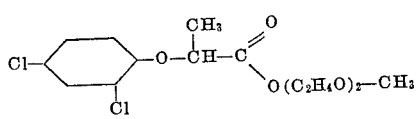

Following the procedure of Example 1, 100 grams (0.426 mole) of alpha-(2,4-dichlorophenoxy)propionic acid and 53.8 grams (0.4475 mole) of 2-(2-methoxyethoxy)ethanol were reacted together in the presence of 250 milliliters of ethylene dichloride and one milliliter of concentrated sulfuric acid and the product separated as before to obtain the 2-(2-methoxyethoxy)ethyl ester of alpha-(2,4-dichlorophenoxy)propionic acid having a refractive index ($n/D$) of 1.5135 at 25° C. and a specific gravity (25°/25°) of 1.2564.

*Example 4.—Polypropylene glycol butyl ether ester of alpha-(2,4-dichlorophenoxy)propionic acid*

10 pounds of alpha-(2,4-dichlorophenoxy)propionic acid, 6.52 pounds of a mixed polypropylene glycol butyl ether (having an average molecular weight of 153 and containing 72 percent of 1-butoxy-2-propanol, 20 percent of butoxypropoxypropanol and 8 percent of the butyl ethers of tri- and higher polypropylene glycols), 1000 milliliters of monochlorobenzene and 10 milliliters of concentrated sulfuric acid were mixed together and heated to a temperature of 140° C. 1000 milliliters more chlorobenzene was then added to the mixture and heating was continued for a period of about 10 hours at temperatures of from 130° to 159° C. During this period, 310 milliliters of water of reaction was recovered as distillate and 500 milliliters additional monochlorobenzene added to the reaction mixture. Upon completion of the reaction, the crude product was washed twice with dilute aqueous sodium carbonate solution and twice with water and the chlorobenzene solvent recovered by distillation. The residue was then held under vacuum for a period of time to remove traces of chlorobenzene and water and to obtain as a product the polypropylene glycol butyl ether ester of alpha-(2,4-dichlorophenoxy)propionic acid having a refractive index ($n/D$) of 1.4958 at 25° C. and a chlorine content of 19.7 percent by weight by analysis as compared to a theoretical chlorine content of 19.2 percent.

*Example 5.—1-butoxy-2-propyl ester of alpha-(2,4-dichlorophenoxy)propionic acid*

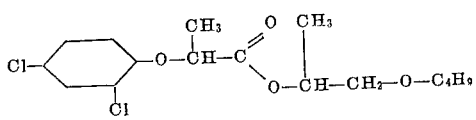

100 grams (0.426 mole) of alpha-(2,4-dichlorophenoxy)propionic acid, 60 grams (0.4475 mole) of 1-butoxy-2-propanol, 250 milliliters of ethylene dichloride and one milliliter of concentrated sulfuric acid were mixed together and heated for a period of about 2 hours at temperatures of from 90° to 100° C. Water of reaction was separated and the product worked up as in Example 1 to obtain the 1-butoxy-2-propyl ester of alpha-(2,4-dichlorophenoxy)propionic acid as an oily liquid having a refractive index ($n/D$) of 1.4968 at 25° C. and a specific gravity (25°/25°) of 1.1527.

In a similar fashion, one molecular proportion of 1-(2-isopropoxyethoxy)-2-propanol is reacted with one molecular proportion of alpha-(2,4-dichlorophenoxy)propionic acid to prepare the 1-(2-isopropoxyethoxy)-2-propyl ester of alpha-(2,4-dichlorophenoxy)propionic acid as an oily liquid, soluble in benzene, xylene and acetone and substantially insoluble in water.

The compounds of the invention are dissolved in kerosene or fuel oil at a concentration of 5 pounds of the active compound per 10 gallons of the carrier and sprayed so as to wet thoroughly the lower 2 feet of the trunks of oak and maple saplings growing in mixed stand with poplar. Substantially 100 percent control of the oak and maple is obtained with little or no observable damage to poplars inadvertently sprayed during the operation.

I claim:

1. The esters of alpha-(2,4-dichlorophenoxy)propionic acid having the formula

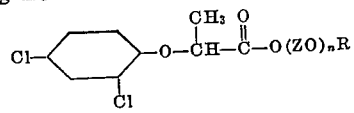

wherein each Z is selected from the group consisting of ethylene and propylene radicals, $n$ is an integer from 1 to 3, inclusive, and R represents an alkyl radical containing from 1 to 4 carbon atoms, inclusive.

2. The esters of alpha-(2,4-dichlorophenoxy)propionic acid having the formula

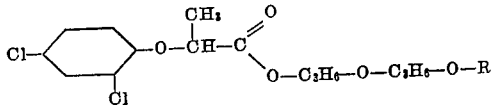

wherein R represents an alkyl radical containing from 1 to 4 carbon atoms, inclusive.

3. The esters of alpha-(2,4-dichlorophenoxy)propionic acid having the formula

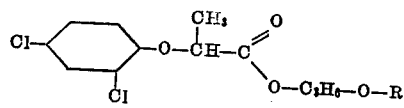

wherein R represents an alkyl radical containing from 1 to 4 carbon atoms, inclusive.

4. The butoxypropoxypropyl ester of alpha-(2,4-dichlorophenoxy)propionic acid.

5. The butoxypropyl ester of alpha-(2,4-dichlorophenoxy)propionic acid.

6. The esters of alpha-(2,4-dichlorophenoxy)propionic acid having the formula

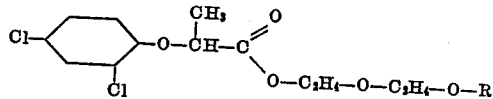

wherein R represents an alkyl radical containing from 1 to 4 carbon atoms, inclusive.

7. The esters of alpha-(2,4-dichlorophenoxy)propionic acid having the formula

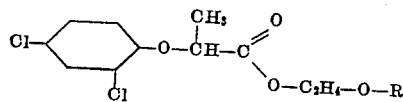

wherein R represents an alkyl radical containing from 1 to 4 carbon atoms, inclusive.

8. The methoxyethoxyethyl ester of alpha-(2,4-dichlorophenoxy)propionic acid.

9. The ethoxyethyl ester of alpha-(2,4-dichlorophenoxy)propionic acid.

References Cited in the file of this patent
UNITED STATES PATENTS

| | | |
|---|---|---|
| 2,396,513 | Jones | Mar. 12, 1946 |
| 2,523,228 | Mullison | Sept. 19, 1950 |
| 2,596,089 | Allen | May 13, 1952 |